United States Patent [19]

Mickler

[11] Patent Number: 4,876,887
[45] Date of Patent: Oct. 31, 1989

[54] THERMAL FLUX MASS FLOWMETER

[76] Inventor: Brian E. Mickler, 4028 Tamworth Rd., Fort Worth, Tex. 76116

[21] Appl. No.: 211,891

[22] Filed: Jun. 27, 1988

[51] Int. Cl.$^4$ ............................................. G01F 1/68
[52] U.S. Cl. .................................. 73/204.11; 73/204.26
[58] Field of Search ........... 73/204.25, 204.26, 204.27, 73/204.11

[56] References Cited

U.S. PATENT DOCUMENTS 4,517,838  5/1985  Wachi et al.
4,691,566  9/1987  Aine .................................... 73/204.26
4,735,086  4/1988  Follmer ......................... 73/204.26 X Primary Examiner—Herbert Goldstein
Attorney, Agent, or Firm—James E. Bradley

[57] ABSTRACT

A mass flowmeter for measuring velocity of a flowing fluid employs a thermal sensor. The sensor generates heat when supplied with electrical power. A heat sink is located in the fluid flow directly across from the sensor perpendicular to the flowing fluid. Electrical power is supplied to the sensor to cause a thermal flux to flow from the sensor to the heat sink. The flowing fluid modulates this flux. A circuit measures the temperature of the sensor and computes the velocity of the flowing fluid from that measurement.

8 Claims, 2 Drawing Sheets

THERMAL FLUX MASS FLOWMETER

BACKGROUND OF THE INVENTION

1. Field of the Invention

This invention relates in general to devices for measuring fluid flow and in particular to a thermal fluid flowmeter.

2. Description of the Prior Art

There are many different types of flowmeters for measuring velocity of a fluid. The term "fluid" as used in this application refers both to liquid and gas flow. One category of flowmeter is known as a "thermal" flowmeter. There are two general types of thermal flowmeters.

In one type, a flow pipe is employed with a passage for the fluid flow to be measured. One or more electric heaters are located in the flow or the sensor pipe. The heaters apply heat to the fluid as it flows through the sensor pipe. The temperature is measured at two different points in the sensor pipe. The difference in the temperature between the upstream and downstream point can be correlated to velocity.

In the second category of thermal mass flowmeters, a heater/temperature sensor is positioned on a boom and immersed into the flowing fluid stream. A circuit senses the temperature response of the sensor as a function of the mass fluid flow rate.

Each of these thermal flowmeters has in common the fact that the rate of heat flow into the fluid from the sensor is directly proportional to the mass flow rate of the fluid. The accuracy of these conventional thermal mass flowmeters is limited to a relatively narrow range of flow velocities. With low velocities, accuracy is limited by spurious heat losses due to convection and leakage into the environment. For high velocities, accuracy is limited by the finite thermal resistance of the sensor element or elements.

In order to avoid the high velocity range limitation, a common technique is to use a main pipe within which are contained laminar flow elements. These laminar flow elements are arranged to produce a certain pressure drop for the desired range of velocities to be measured. The pressure difference upstream and downstream of the laminar flow elements is proportional to the volume flow rate of the fluid to be measured.

A sensor pipe branches off from the main pipe and reenters downstream. This sensor pipe carries heating elements and sensors. A much smaller fluid flow will flow through the sensor pipe than the main pipe. The velocity of the flow in the sensor pipe is measured, it being proportional to the main velocity flowing through the main pipe. Even though this is workable, flow rates outside of the design range can still not be accurately measured without modifying the laminar flow elements.

In U.S. Pat. No. 4,517,838, Wachi et al., May 21, 1985, a heat conducting case is shown. The case has a fine groove in a sensor pipe. Heating means is mounted in the fine groove so as to measure the fluid flow. The small size of the sensor pipe necessitated by such a fine groove further restricts the high fluid velocity measurement capability of the flowmeter.

SUMMARY OF THE INVENTION

In this invention, a sensor is placed in the main flow of the fluid. The sensor is capable of generating heat when supplied with electrical power. A heat sink is placed in the flowing fluid directly across from the sensor, perpendicular to the direction of fluid flow.

Electrical power supplied to the sensor causes a thermal flux to flow from the sensor to the heat sink, which absorbs the heat. This thermal flux is modulated by the flowing fluid. Circuitry measures the temperature rise of the sensor and computes from that measurement the velocity of the flowing fluid.

DETAILED DESCRIPTION OF THE INVENTION

Figure 1:
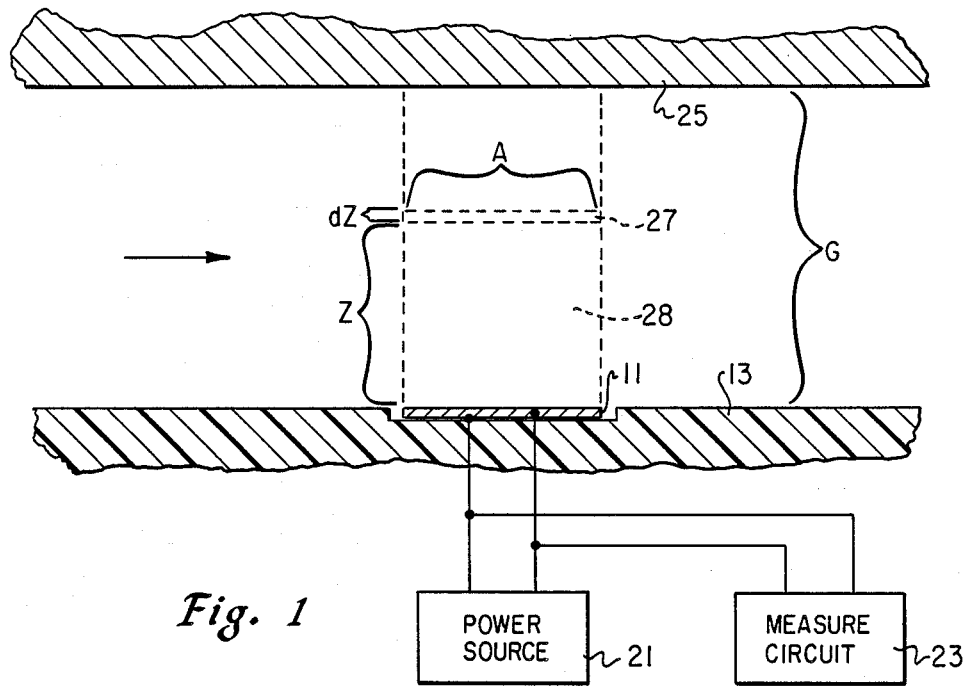
FIG. 1 is a schematic representation of a first embodiment of the invention.
Figure 4:
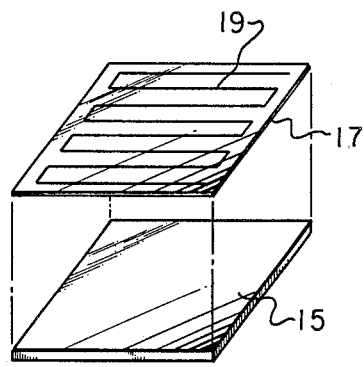
FIG. 4 is a schematic view illustrating in exploded form one of the sensors for the invention.

With reference to FIG. 1, a combination heat source/temperature sensor foil 11 is shown. The sensor 11 is mounted in an insulator 13. Sensor 11 is preferably a conventional type element that is normally used to record temperatures. As illustrated in FIG. 4, it has a thin insulation layer or substrate 15 of material such as Kapton. The substrate 15 is coated or clad with a thin layer 17 of conductive metal. The metal layer is etched into a sinuous coil pattern 19. Fine very thin lines are cut into the metal layer 17 to create the coil 19. The coil 19 and the substrate 15 are flat surfaces. Sensors of this general type are conventionally available.

In this invention, the coil 19 of the sensor 11 is connected to a power source 21, as illustrated in FIG. 1, for radiating heat from the sensor 11. Power source 21 provides DC power to flow through the coil 19 (FIG. 4) of the sensor 11. The coil 19 of the sensor 11 generates heat, which radiates from the sensor. A measuring circuit 23 measures the power supplied, and thus obtains an indication of the temperature.

A heat sink 25 is mounted across from the sensor 11. Heat sink 25 is of a metal that readily conducts heat and thus attracts and absorbs the heat generated from the sensor 11. The surface of the heat sink 25 is flat and parallel with the sensor 11. The fluid flow is perpendicular to lines normal to the sensor 11 and heat sink 25.

For the purposes of analyzing and describing the behavior, an incremental volume 27 of the fluid is shown located within an active volume 28 between the sensor 11 and heat sink 25. The following definitions apply:

$z$ = distance between sensor 11 and incremental volume 27;

$dz$ = thickness of the incremental volume 27;

$A$ = area of the incremental volume 27;

$T_O$ = temperature of the sensor 11;

$Ta_a$ = ambient temperature of heat sink 25 and the fluid flowing through the flowmeter;

$T$ = temperature of the fluid within the incremental volume 27;

$Q$ = heat;

$C$ = thermal capacity or specific heat of the fluid (BTU/lb. F);

$D$ = density of the fluid (lb/cu in);

$K$ = thermal conductivity of the fluid (BTUin/hr.sq.ft.F);

d = differential operator;
t = time;
V = average molecular velocity in feet per minute (fpm) of the fluid flowing past sensor 11; and
W = power in watts being furnished to the fluid by the sensor 11.

A constant fluid velocity profile is assumed across the gap between the sensor 11 and the heat sink 25. The heat Q1 contained in the incremental volume 27 is proportional to the thermal capacity C of the fluid, the mass of the fluid (DAdz), and its temperature T as follows:

$$Q1 = CDTAdz$$

The rate of heat storage in incremental volume 27 is dQ1/Dt minus the rate at which heat is being removed from the element by fluid flowing at velocity V, as follows:

$$dQ1/dt = CDAdz(dT/dt) - CDAdz(T-T_a)V = -CDAdz[dT/dt - (T-T_a)V]$$

The rate of heat flow or flux from sensor 11 into incremental volume 27 is proportional to the area of the surface A, the fluid conductivity K, and the outward normal gradient of the temperature dT/dz as follows:

$$dQ2/dt = KAdT/idz$$

The rate of heat flow out of incremental volume 27 is as follows:

$$dQ3/dt = dQ2/dt + d/dz(dQ2/dt)dz = -KAdT/dz - d/dz\,(KAdT/dz)dz$$

By conservation of heat:

$$dQ2/dt - dQ3/dt = dQ1/dt;$$

$$-KAdT/dz + KAdT/dz + d/dz(KAdT/dz)dz = -CDAdz$$
$$[dT/dt - (T-Ta)V];\text{ and}$$

$$d^2T/dz^2 = CD/K[dT/dt - (T-T_a)V]$$

In the steady state, dT/dt = 0, and $$d^2T/dz^2 = CDV/K\,(-T+T_a)$$

This differential equation, along with the following boundary conditions, uniquely describes the thermal environment within the active volume 28 between the sensor 11 and heat sink 25.

1. At z=0 (sensor 11),
   a. dT/dz = −(l/KA) (Power supplied to sensor 11) = −W/KA
   b. T = $T_O$
2. At z=G (heat sink 25 surface), T = $T_a$ Hence the steady state equation describing the temperature T for any location z within the active volume 28 is:

$$T = T_a + [(G-z)W/KA]EXP\,[-(G-z)SQRT(CDV/K)]$$

The steady state equation describing the temperature of the sensor at z = 0 is:

$$T_0 = T_a + [GW/KA]EXP[-(G)SQRT(CDV/K)\,]$$

Therefore, the temperature rise $TR = T_{O} - T_a$ of the sensor 11 above ambient can be expressed as:
TR = (CONSTANT1*G*W/A)*EXP(−G*SQRT(CONSTANT2*V), where CONSTANT1 and CONSTANT2 are determined solely by the properties of the fluid. For the units of measurement chosen in this analysis, CONSTANT1 = 482.4/K, and CONSTANT2 = 103,000 (CD/K).

This equation has the remarkable property that the overall variation and sensitivity of TR (temperature rise of the sensor 11 over the ambient temperature of the flowing fluid) to fluid velocity can be dictated for any desired fluid type or range of velocities simply by specifying the gap dimension G.

In the examples listed below, rather than the preferred etched sensor 11 described above, a prototype sensor was used. It had a coil of sixty turns of 0.0018 inch diameter annealed copper wire sandwiched between two brass disks.

EXAMPLE 1 For P=0.4 Watts

G = 0.025 Inches
A = 0.3 Sq. Inches
FLUID TYPE = AIR @STD. TEMP & PRESSURE
TR at V=0 fpm will be 100.5° F.;
TR at V=20 fpm will be 74.5° F.; and
TR at V=5000 fpm will be 0.8° F.

EXAMPLE 2 For P=2 Watts

G = 0.04 Inches
A = 0.3 Sq. Inches
FLUID TYPE = WATER
TR at V=0 fpm will be 30.99° F.;
TR at V=0.1 fpm will be 21.23° F.; and
TR at V=20 fpm will be 0.7.° F.

Both of these examples illustrate the high resolution available at low flow rates for both air and water, as well as the capability of acquiring measureable data at high flow rates using the present invention. Because the average temperature rise of the fluid in the active volume of the invention at zero velocity is very small compared to conventional thermal flowmeters, posture and convection errors are negligible.

Figure 2:
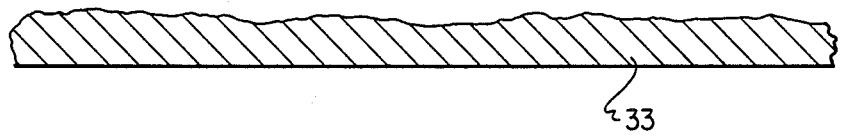
FIG. 2 is a schematic representation of a second embodiment of the invention.
Figure 2:

The second embodiment of FIG. 2 illustrates how to minimize spurious heat losses due to the insulating surface 13 of FIG. 1. In FIG. 2, the sensor 29 is the same as the sensor 11 of FIG. 1, however, it is suspended equidistant between two heat sinks 31, 33. The fluid flows on both side of the sensor 29. The heat sink surfaces 31, 33, are at the same ambient temperature as the temperature of the flowing fluid. The area of both faces or sides of the sensor 29 is used in calculating the temperature/fluid velocity relationship. Because of the thinness of the substrate of the sensor 29, substantially equal amounts of heat will flow in both directions from the sensor 29.

Figure 3:
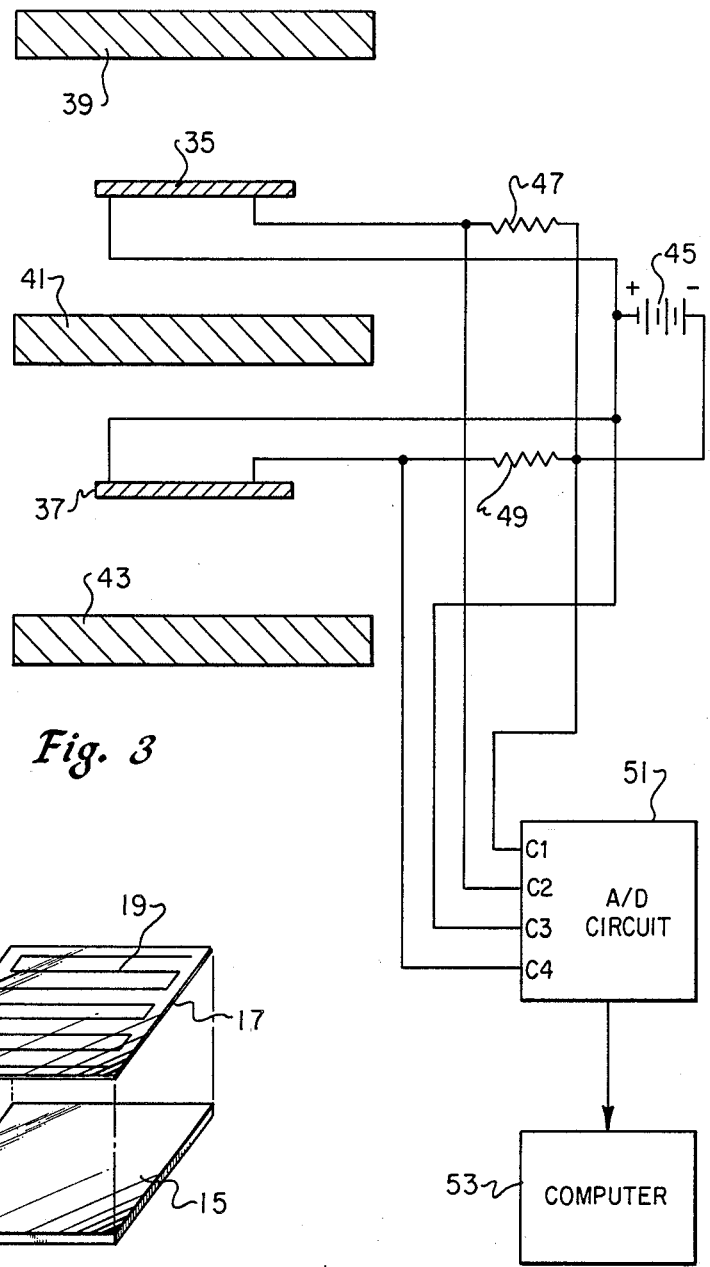
FIG. 3 is a schematic representation of a third embodiment of the invention.

FIG. 3 illustrates a third embodiment. In this embodiment, one can compensate for the varying temperatures of the fluid entering the thermal flux fluid flowmeter. In this embodiment, sensor 35 is the measuring or active sensor, similar to sensor 11 or sensor 29 of FIGS. 1 and 2. Sensor 35 is located equidistant between two heat sinks 39, 41.

A second sensor 37 is spaced equidistant between the heat sink 41 and another heat sink 43. Sensor 37 is of the same construction as sensor 35, however, it will be a reference sensor. The reference sensor 37 has thermal properties identical to the active sensor 35, but the power employed in making the reference sensor 37 temperature measurement is set to less than one hundredth of that used in the active sensor 35. In this case, DT is the temperature of the active sensor 35 minus the temperature of the reference sensor 37.

Referring still to FIG. 3, a battery 45 or DC power source has its positive leads connected to one side of the coils of the sensors 35, 37. The active sensor 35 has the other end of its coil connected to a resistor 47. In one embodiment, resistor 47 is a ten ohm resistor. The reference sensor 37 has its other side connected to a resistor 49. In one embodiment, resistor 49 is a two hundred ohm resistor.

The opposite sides of the resistors 47, 49 are connected to the negative side of the power source 45. The negative side of the power source 45 is also connected to a terminal C1 of a conventional analog voltage-to-digital data acquisition system or converter 51. The terminal C2 of the A/D converter 51 is connected between resistor 47 and the active sensor 35. The terminal C3 is connected to the positive side of the battery 45. The terminal C4 is connected between resistor 49 and the reference sensor 37. The A/D converter 51 is connected to a conventional computer 53. The A/D converter 51 collects the analog voltages at its terminal C1, C2, C3, and C4 and supplies digital data to the computer 53 for calculating the velocities.

In an embodiment of FIG. 3, the gaps between heat sinks 39 and 41 and between heat sinks 41 and 43 are selected to be .025 inches. The values of the resistors 47, 49 yield about 0.4 watts to the active sensor 35 and about one hundredth of that value to the reference sensor 37. The following equations are programmed into the computer 53 to yield the desired quantities:

Resistance of active sensor 35:

$$R_a = 10(C3-C2)/(C2-C1) \text{ ohms}$$

Power being delivered to active sensor 35:

$$W = (C3-C2)(C2-C1)/10 \text{ watts}$$

Resistance of reference sensor 37:

$$R_r = 200(C3-C4)/(C4-C1) \text{ ohms}$$

Temperature above ambient of active sensor 35:
$DTa = 458.01(R_1$ with power applied $-R_a$ @ambient temperature)/$(R_a$ @ambient temperature) degrees F.
Temperature above ambient of reference sensor 37:
$DTr = 458.01 (R_r$ with power applied $-R_r$ @ambient temperature)/$(R_r$ @ambient temperature) degrees F.
Temperature rise:
$TR - DTa - DTr$ degrees F.

in general, the expression for apparent fluid velocity is:

$$V = (K/10300CD)[\text{LOG } (482.4gw/AKTR)/G]^2$$

Using the following values for the thermal properties of air at 70° F. and one atmosphere:
C=0.24 BTU/lbF
D=0.0000464 lb/cu in
K=0.16 BTU. in/hr sq ft and the design constants chosen for the realization of the present invention as an anemometer are:
A=0.4 sq. in
G=0.025 in The specific apparent fluid velocity equation programmed is:

$$V = 2230 [\text{LOG } (188W/TR)]^2$$

The resulting output velocity is linear to within five percent over inputs spanning a range from two feet per minute to two thousand feet per minute, and the zero stability and posture error for this embodiment of the invention is less than plus or minus 0.5 fpm over an ambient temperature range of 70°-110° F. Even better linearity is possible by making further refinements to the preceding algorithms to correct for such factors as the measureable series and shunt thermal impedances of the active sensor 35, as well as deviations from the assumed constant velocity profile of the fluid due to viscosity or other factors.

The invention has significant advantages. The thermal mass flowmeter of this invention improves the high and low velocity limitations of conventional mass flowmeters by employing a unique thermal flux modulation technique to enable the accommodation of a wide range of fluid types and velocities.

While the invention has been shown in only three of its forms, it should be apparent to those skilled in the art that it is not so limited but is susceptible to various changes without departing from the scope of the invention.

I claim:

1. A mass flowmeter for measuring the velocity of a flowing fluid, comprising in combination:
    a sensor adapted to be placed in the flowing fluid, the sensor being capable of generating heat when supplied with electrical power, the sensor having a resistance which is a function of temperature;
    a heat sink located a selected distance from the sensor in a direction substantially perpendicular to the flowing fluid;
    means for supplying electrical power to the sensor to cause a thermal flux to flow from the sensor to the heat sink which is modulated by the flowing fluid, the heat sink and the sensor being separated from each other by a space that is unobstructed so as to allow the thermal flux to flow from the sensor to the heat sink in a direction substantially perpendicular to the flowing fluid;
    means for computing the temperature rise of the sensor over the ambient temperature of the heat sink and the flowing fluid by measuring the resistance of the sensor with said electrical power supplied and subtracting from this measurement the resistance of the sensor at said ambient temperature to determine a difference, and for computing from said difference the temperature rise of the sensor above said ambient temperature, and for computing from said temperature rise and said electrical power supplied, the velocity of the flowing fluid.

2. The flowmeter according to claim 1 wherein the sensor comprises a resistive element.

3. The flowmeter according to claim 1 wherein the sensor comprises a substrate clad with a metal layer defining a resistive element.

4. A mass flowmeter for measuring the velocity of a flowing fluid, comprising in combination:
    a pair of metal heat sinks mounted to the flowmeter for contact with the flowing fluid in directions substantially perpendicular to the flowing fluid;

a sensor carried by the flowmeter between the heat sinks, the sensor having radiating surfaces on each side for radiating heat in opposite directions toward the heat sinks, the sensor being capable of generating heat in the radiating surfaces when supplied with electrical power, the sensor having a resistance which is a function of temperature;

means for supplying electrical power to the sensor to cause a thermal flux to flow from the radiating surfaces of the sensor to the heat sinks, the thermal flux being modulated by the flowing fluid, the heat sinks and the sensor being separated from each other by a space that is unobstructed so as to allow the thermal flux to flow unimpeded from the sensor to the heat sinks in directions substantially perpendicular to the flowing fluid; and means for computing the temperature rise of the sensor radiating surfaces over the ambient temperature of the heat sink and the flowing fluid by measuring the resistance of the sensor with said electrical power supplied and subtracting from this measurement the resistance of the sensor at said ambient temperature to determine a difference, and for computing from said difference the temperature rise of the sensor above said ambient temperature, and for computing the velocity of the flowing fluid from said temperature rise and the power supplied to the sensor.

5. A mass flowmeter for measuring the velocity of a flowing fluid, comprising in combination:

a reference sensor and an active sensor, each adapted to be placed in the flowing fluid, each sensor having flat radiating surfaces on each side for radiating heat in opposite directions, the sensors being capable of generating heat in the radiating surfaces when supplied with electrical power, the sensors being spaced apart from each other in a direction substantially perpendicular to the flowing fluid and with the radiating surfaces parallel to each other;

three metal heat sinks carried with the sensors, one of the heat sinks positioned between the sensors, another of the heat sinks positioned on the opposite side of the reference sensor, and the other heat sink positioned on the opposite side of the active sensor, the heat sinks all being parallel to and spaced the same distance from one of the radiating surfaces in directions perpendicular to the direction of the flowing fluid;

means for supplying electrical power to the active sensor to cause a thermal flux to flow from the radiating surfaces of the active sensor to the heat sinks on each side of the active sensor, the thermal flux being modulated by the flowing fluid;

means for supplying electrical power to the reference sensor at a substantially lower level than the power supplied to the active sensor; and means for measuring the temperature of the active sensor radiating surfaces and the reference sensor radiating surfaces, for subtracting the temperature of the reference sensor from that of the active sensor, and for computing the velocity of the flowing fluid based upon the temperature difference.

6. A method of measuring the velocity of a flowing fluid, comprising in combination:

placing a first sensor in the flowing fluid, the first sensor being capable of generating heat when supplied with electrical power;

placing a first heat sink a selected distance from the first sensor in a direction substantially perpendicular to the flowing fluid;

placing a second heat sink in the flow fluid on a side of the first sensor opposite from said first heat sink and at an equal distance;

placing a second sensor in the flowing fluid on a side of the second heat sink opposite from said first sensor and at the same distance;

placing a third heat sink in the flowing fluid on a side of the second sensor opposite from the second heat sink and at the same distance;

supplying electrical power to the first sensor to cause a thermal flux to flow from the first sensor to the first heat sink which is modulated by the flowing fluid;

supplying electrical power to the second sensor, but at a much lower rate than the power supplied to the first sensor;

measuring the temperature rise of the first sensor over that of the ambient temperature of the flowing fluid; and measuring the temperature of the second sensor and subtracting that measurement from the measurement of the temperature of the first sensor, and using the difference to compute the velocity of the flowing fluid.

7. A mass flowmeter for measuring the velocity of a flowing fluid, comprising in combination:

a reference sensor and an active sensor, each adapted to be placed in the flowing fluid, each sensor having a radiating surface for radiating heat in opposite directions, the sensors being capable of generating heat in the radiating surfaces when supplied with electrical power, the sensors being spaced apart from each other in a direction substantially perpendicular to the flowing fluid;

three metal heat sinks carried with the sensors, one of the heat sinks positioned between the sensors, another of the heat sinks positioned on the opposite side of the reference sensor, and the other heat sink positioned on the opposite side of the active sensor, the heat sinks all being spaced from one of the radiating surfaces in directions perpendicular to the direction of the flowing fluid;

means for supplying electrical power to the active sensor to cause a thermal flux to flow from the radiating surfaces of the active sensor to the heat sinks on each side of the active sensor, the thermal flux being modulated by the flowing fluid;

means for supplying electrical power to the reference sensor at a substantially lower level than the power supplied to the active sensor; and means for measuring the temperatures of the active sensor radiating surfaces and the reference sensor radiating surfaces, for subtracting the temperature of the reference sensor from that of the active sensor, and for computing the velocity of the flowing fluid based upon the temperature difference.

8. A mass flowmeter for measuring the velocity of a flowing fluid, comprising in combination:

a reference sensor and an active sensor, each adapted to be placed in the flowing fluid, each sensor having a radiating surface for radiating heat, the sensors being capable of generating heat in the radiating surfaces when supplied with electrical power, the sensors being spaced apart from each other in a direction substantially perpendicular to the flowing fluid;

first and second metal heat sink surfaces carried with the sensors, the first heat sink surface positioned a selected distance from the active sensor in a direction substantially perpendicular to the flowing fluid, the second heat sink surface positioned a selected distance from the reference sensor in a direction substantially perpendicular to the flowing fluid;

means for supplying electrical power to the active sensor to cause a thermal flux to flow from the radiating surface of the active sensor to the first heat sink surface in a direction substantially perpendicular to the flowing fluid, the thermal flux being modulated by the flowing fluid;

means for supplying electrical power to the reference sensor at a substantially lower level than the power supplied to the active sensor to cause a thermal flux to flow from the radiating surface of the reference sensor to the second heat sink surface in a direction substantially perpendicular to the flowing fluid; and means for measuring the temperatures of the active sensor radiating surfaces and the reference sensor radiating surfaces, for subtracting the temperature of the reference sensor from that of the active sensor, and for computing the velocity of the flowing fluid based upon the temperature difference and the power supplied to the active sensor.

* * * * *